United States Patent
Gupta et al.

(10) Patent No.: US 10,796,281 B2
(45) Date of Patent: Oct. 6, 2020

(54) COMPUTER IMPLEMENTED SYSTEM FOR MONITORING MEETINGS AND ACTION ITEMS AND METHOD THEREOF

(71) Applicant: Zensar Technologies Ltd., Pune, Maharashtra (IN)

(72) Inventors: Ashutosh Gupta, Indore (IN); Sandeep Kishore, Fremont, CA (US)

(73) Assignee: ZENSAR TECHNOLOGIES LTD., Pune, Maharashtra (IN)

( * ) Notice: Subject to any disclaimer, the term of this patent is extended or adjusted under 35 U.S.C. 154(b) by 82 days.

(21) Appl. No.: 16/171,616

(22) Filed: Oct. 26, 2018

(65) Prior Publication Data

US 2019/0130355 A1 May 2, 2019

(30) Foreign Application Priority Data

Oct. 28, 2017 (IN) .............................. 201721038333

(51) Int. Cl.
| | |
|---|---|
| G06Q 10/10 | (2012.01) |
| G10L 15/22 | (2006.01) |
| G10L 15/30 | (2013.01) |
| G10L 15/26 | (2006.01) |

(52) U.S. Cl.
CPC .............. *G06Q 10/10* (2013.01); *G10L 15/22* (2013.01); *G10L 15/26* (2013.01); *G10L 15/265* (2013.01); *G10L 15/30* (2013.01); *G10L 2015/223* (2013.01)

(58) Field of Classification Search
CPC .......... G06Q 10/10; G10L 15/22; G10L 15/30
See application file for complete search history.

(56) References Cited

U.S. PATENT DOCUMENTS

| | | | | |
|---|---|---|---|---|
| 2012/0278388 | A1* | 11/2012 | Kleinbart | G06Q 10/06 709/204 |
| 2016/0234268 | A1* | 8/2016 | Ouyang | H04L 65/403 |
| 2019/0108834 | A1* | 4/2019 | Nelson | G10L 15/1815 |

* cited by examiner

*Primary Examiner* — Roland J Casillas
(74) *Attorney, Agent, or Firm* — Hamre, Schumann, Mueller & Larson, P.C.

(57) ABSTRACT

The present disclosure envisages a computer implemented system for monitoring meetings and action items. The system comprises an agenda receiver to receive agenda inputs from a plurality of employees, an agenda identifier to identify at least one agenda, an audio recorder to record audio of a meeting and generates audio data, a speech to text converter to convert the audio data into to generate minutes of meeting data, an action item identifier to identify a plurality of action items, an action item assignor to assign each of the action items to at least one of the employees, an action item tracker to track each of the action items to determine a progress status of the action item.

17 Claims, 4 Drawing Sheets

__US 10,796,281 B2__

COMPUTER IMPLEMENTED SYSTEM FOR MONITORING MEETINGS AND ACTION ITEMS AND METHOD THEREOF

FIELD

The present disclosure relates to the field of monitoring system.

Definitions

As used in the present disclosure, the following terms are generally intended to have the meaning as set forth below, except to the extent that the context in which they are used indicates otherwise.

The expression "action item" used hereinafter in this specification refers to, but is not limited to, a documented event, task, activity, or action that needs to be completed.

The expression "accountable employee" used hereinafter in this specification refers to, but is not limited to, an employee having a responsibility with respect to an action item completion.

These definitions are in addition to those expressed in the art.

BACKGROUND

The process of planning, scheduling, and holding meetings include many steps such as inviting agenda for a meeting, selecting final agenda of the meeting, circulating the pre-reads of the meeting, creating minutes of the meeting, identifying and allocating action items to accountable employees, and following up with the accountable employees for the statuses of the action items, and the like. All these steps are prone to human errors and require multiple follow-ups with every participant of the meeting which makes the whole process unproductive and inefficient.

There is, therefore, felt a need to provide a computer implemented system for monitoring meetings and action items that alleviates the above mentioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a computer implemented system for monitoring meetings and action items.

Another object of the present disclosure is to provide a computer implemented system for monitoring meetings and action items that reduces the need of follow-up.

Yet another object of the present disclosure is to provide a computer implemented system for monitoring meetings and action items allows employees to access previous minutes of meetings.

Other objects and advantages of the present disclosure will be more apparent from the following description, which is not intended to limit the scope of the present disclosure.

SUMMARY

The present disclosure envisages a computer implemented system for monitoring meetings and action items comprising a repository, a registration module, a login module, an agenda receiver, an agenda identifier, an audio recorder, a speech to text converter, a meeting database, an action item identifier, an action item priority assignor, an action item assignor, an action item tracker, and a dashboard.

The repository is configured to store agenda identification rules, action item identification rules, action item prioritization rules, and action item assignment rules. The registration module is configured to receive employee information data from a plurality of employees and is further configured to facilitate registration of the plurality of employees.

The login module is configured to receive login details from the plurality of employees and is further configured to facilitate login of the plurality of the employees.

The agenda receiver is configured to receive agenda inputs from the plurality of the logged-in employees.

The agenda identifier is configured to cooperate with the agenda receiver to receive agenda inputs and is further configured to identify at least one agenda by re-arranging and shortlisting the received agenda inputs based on the agenda identification rules;

The audio recorder is configured to record audio of a meeting with respect to the identified agenda and generates audio data.

The speech to text converter is configured to cooperate with the audio recorder to receive the audio data of the meeting and is further configured to convert the audio data into a text format to generate minutes of meeting data.

The meeting database is configured to cooperate with the agenda identifier and the speech to text converter to receive and store the identified agenda and the minutes of meeting data, respectively.

The action item identifier is configured cooperate with the meeting database to receive the minutes of meeting data and is further configured to identify a plurality of action items from the minutes of meeting data, based on the action item identification rules.

The action item priority assignor is configured to assign priority to each of the identified action items, based on the action item prioritization rules.

The action item assignor is configured to assign each of the action items to at least one of the employees from the plurality of the employees, based on the action item assignment rules.

The action item tracker is configured to track each of the action items to determine a progress status of the action item, and is further configured to send a reminder to the employee with respect to the assigned action item.

The dashboard is configured to cooperate with the agenda identifier, the meeting database, the action item identifier, the action item assignor and the action item tracker, and is further configured to display identified agendas, minutes of the meeting data, identified action items, assignment of each of the action item, the progress status of action items. In an embodiment, the registration module, the login module, the agenda receiver, the agenda identifier, the speech to text converter, the action item identifier, the action item priority assignor, the action item assignor, the action item tracker, and the dashboard are configured to be implemented using one or more processor(s).

In an embodiment, the computer implemented system for monitoring meetings and action items further includes a directory and a search module. The directory is configured to store email id and phone numbers of the employees. The search module is configured to facilitate search of any email id, phone number, action items, meeting agendas in the directory and the meeting database. The directory and the search module are implemented using one or more processor(s).

In an embodiment, the meeting database is further configured to store pre-reads related to the meeting.

In an embodiment, the login module includes a verifier module configured to verify the employee by comparing the receive login details with a pre-stored login details of the employee.

In an embodiment, the computer implemented system for monitoring meetings and action items includes a classification module. The classification module is configured to classify the action items based on the priority of the action item, the progress status of the action item, and the employee to which the action item is assigned. The classification module is implemented using one or more processor(s).

In an embodiment, the computer implemented system for monitoring meetings and action items includes a broadcast module. The broadcast module is configured to cooperate with the meeting database, the action item assignor to broadcast the identified agenda, minutes of meeting data, the pre-reads related to the meeting, and the assigned action item to an employee's mobile device. The broadcast module is implemented using one or more processor(s).

In an embodiment, the computer implemented system for monitoring meetings and action items includes a notepad module. The notepad module is configured to facilitate each of the employees to take personal notes.

In an embodiment, the audio recorder includes a voice recognition unit configured to identifying the employee.

The present disclosure envisages a computer implemented method for monitoring meetings and action items comprises the steps of:
storing, in a repository, agenda identification rules, action item identification rules, action item prioritization rules, and action item assignment rules;
receiving, by the registration module, employee information data from a plurality of employees and facilitating registration of the plurality of employees;
receiving, the login module, login details from the plurality of employees and facilitating login of the plurality of the employees;
receiving, by an agenda receiver, agenda inputs from the plurality of the logged-in employees;
receiving, by an agenda identifier, agenda inputs and identifying at least one agenda by re-arranging and shortlisting the received agenda inputs based on the agenda identification rules;
recording audio, by an audio recorder, of a meeting with respect to the identified agenda and generating audio data;
receiving, by a speech to text converter, the audio data of the meeting and converting the audio data into a text format to generate minutes of meeting data;
storing, in a meeting database, the identified agenda and the minutes of meeting data, respectively;
receiving, by an action item identifier, the minutes of meeting data and identifying a plurality of action items from the minutes of meeting data, based on the action item identification rules;
assigning, by an action item priority assignor, priority to each of the identified action items, based on the action item prioritization rules;
assigning, by an action item assignor, each of the action items to at least one of the employees from the plurality of the employees, based on the action item assignment rules;
tracking, by an action item tracker, each of the action items to determine a progress status of the action item, and sending a reminder to the employee with respect to the assigned action item; and
displaying, by a dashboard, the identified agendas, the minutes of meeting data, the identified action items, the assignment of each of the action item, and the progress status of action items.

BRIEF DESCRIPTION OF THE ACCOMPANYING DRAWING

A computer implemented system for monitoring meetings and action items, of the present disclosure will now be described with the help of the accompanying drawing, in which.

Figure 1:
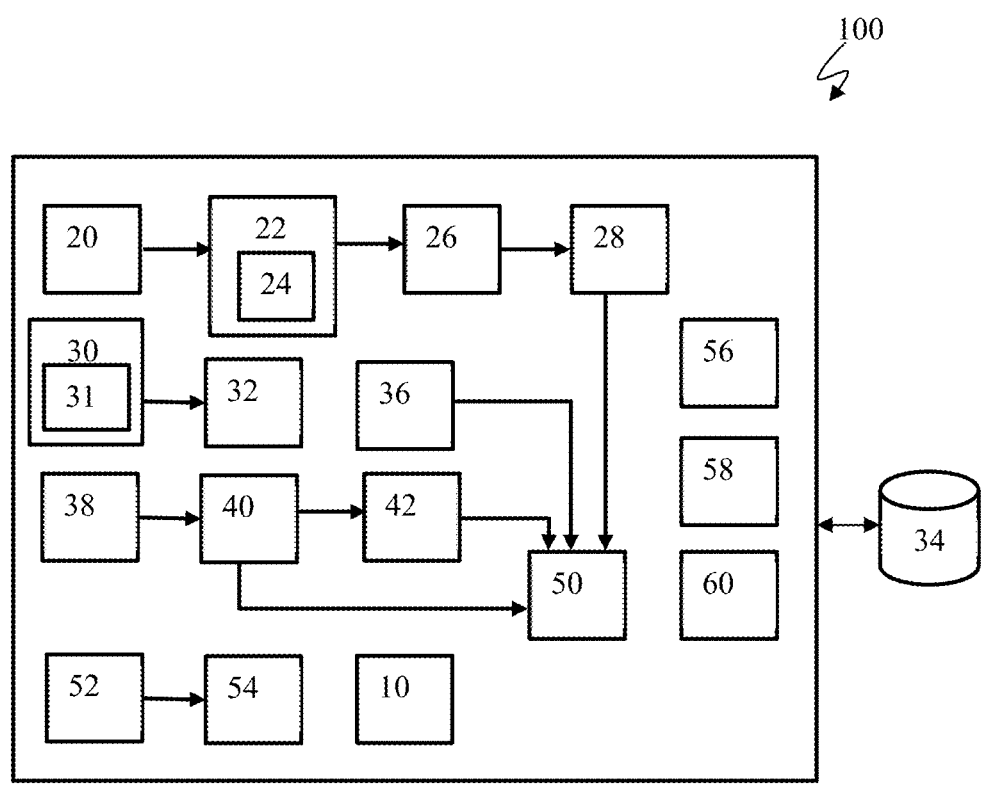
FIG. 1 illustrates a schematic block diagram of a computer implemented system for monitoring meetings and action items, in accordance with an embodiment of the present disclosure.

LIST AND DETAILS OF REFERENCE NUMERALS USED IN THE DESCRIPTION AND DRAWING:

| | |
|---|---|
| 10 | repository |
| 20 | registration module |
| 22 | login module |
| 24 | verifier module |
| 26 | agenda receiver |
| 28 | agenda identifier |
| 30 | audio recorder |
| 31 | voice recognition unit |
| 32 | speech to text converter |
| 34 | meeting database |
| 36 | action item identifier |
| 38 | action item priority assignor |
| 40 | action item assignor |
| 42 | action item tracker |
| 50 | dashboard |
| 52 | directory |
| 54 | search module |
| 56 | classification module |
| 58 | broadcast module |
| 60 | notepad module |

DETAILED DESCRIPTION

A computer implemented system for monitoring meetings and action items will now be described with the help of accompanying drawing. FIG. 1 illustrates a schematic block diagram of the computer implemented system (100) (hereinafter referred to as 'system') for monitoring meetings and action items, in accordance with one embodiment of the present disclosure.

The system (100) comprises a repository (10), a registration module (20), a login module (22), an agenda receiver (26), an agenda identifier (28), an audio recorder (30), a speech to text converter (32), a meeting database (34), an action item identifier (36), an action item priority assignor (38), an action item assignor (40), an action item tracker (42), and a dashboard (50).

The repository (10) is configured to store agenda identification rules, action item identification rules, action item prioritization rules, and action item assignment rules.

The registration module (20) is configured to receive employee information data from a plurality of employees and is further configured to facilitate registration of the plurality of employees. In an embodiment, the employee information data include name of an employee, designation, team, employee id, employee login id, password etc.

A pseudo code for registration module (20), in accordance with an embodiment of the present disclosure, is now described.

```
Register user devices with MDM ( ); // Mobile Device Management
System
MDM_PUSH_APP( );
User device_receive_APP( ).
```

The login module (22) is configured to receive login details from the plurality of employees and is further configured to facilitate login of the plurality of the employees. In an embodiment, the login module (22) includes a verifier module (24). The verifier module (24) is configured to verify the employee by comparing the receive login details with a pre-stored login details of the employee. In an embodiment, the employees have to register themselves for creating a login id and password.

A pseudo code for login module (22), in accordance with an embodiment of the present disclosure, is now described.

```
Accept Credentials
    Validate against Active Directory
    If valid user then
        return true
    else
        return false
    end if
```

A pseudo code for verifier module (24), in accordance with an embodiment of the present disclosure, is now described.

```
Verifier Module
// Step1
    IF Login Module returns true then
        Let listOfMCMAppADGroups = Pull the list of all AD groups
from the configuration
        Let listOfPermissibleGroups
        Let listOfMenu
        Let MenuItems
        // Step2
        For each group in listOfMCMAppADGroups
            IF user exists in group
                Add to listOfPermissibleGroups
            end if
        Next
        //build Menu per permissible group
        For each group in listOfPermissibleGroups
            IF groupName is "GCM" then
                SET MenuItems = Get all menu items for GCM
                Add MenuItems in listOfMenu
                SET MenuItems = Get all menu items for MCM //
GCM Members are implicitly MCM councils
                Add MenuItems in listOfMenu
                SET MenuItems = Get all menu items available for all
other groups than GCM and MCM
                Add MenuItems in listOfMenu
                Add DefaultMenuItems in listOfMenu
                EXIT FOR
            ELSE IF groupName is "MCM" then
                SET MenuItems = Get all menu items for MCM
                Add MenuItems in listOfMenu
                SET MenuItems = Get all menu items available for all
other groups than MCM // MCM Members are implicitly can view all
independent integration teams
                Add MenuItems in listOfMenu
                Add DefaultMenuItems in listOfMenu
                EXIT FOR
            ELSE
                FOR EACH childGroup in listOfPermissibleGroups
                    SET MenuItems = NULL
                    SET MenuItems = Get all menu items for
childGroup
                    Add MenuItems in listOfMenu
                Next
                Add DefaultMenuItems in listOfMenu
                EXIT FOR
            END IF
        Next
    END IF
```

The agenda receiver (26) is configured to receive agenda inputs from the plurality of the logged-in employees. In an embodiment, the agenda is being invited from all the employees. In an embodiment, the agenda receiver (26) provides a voting choice to employees to select at least one agenda from a plurality of agendas.

A pseudo code for agenda receiver (26), in accordance with an embodiment of the present disclosure, is now described.

```
IF Login module returns TRUE THEN
    GET agenda details from agenda receiver module (Title, Description)
    SAVE the agenda suggested by USER using SharePoint REST API
    Services
    Analyse the agendas suggested by Users
    IF agendas is "Valid"
        Mark agenda as "Considered"
        Map agenda to impacted business category
        Assign agenda to relevant business category owner
    ELSE IF
        Mark agenda as "Not Considered"
    ELSE IF
        Mark agenda as "Pending for Consideration"
    END IF
END IF
```

The agenda identifier (28) is configured to cooperate with the agenda receiver (26) to receive agenda inputs and is further configured to identify at least one agenda by re-arranging and shortlisting the received agenda inputs based on the agenda identification rules. The agenda identifier (28) selects at least one agenda which was raised by maximum number of employees. In another embodiment, the agenda identifier (28) automatically publishes the final agenda, 24 hours before the meeting.

The audio recorder (30) is configured to record audio of a meeting with respect to the identified agenda and generates audio data. In an embodiment, the audio recorder (30) includes a microphone and a noise cancellation unit. In an embodiment, the audio recorder (30) includes a voice recognition unit (31) to identify a speaker (employee).

The speech to text converter (32) is configured to cooperate with the audio recorder (30) to receive the audio data of the meeting and is further configured to convert the audio data into a text format to generate minutes of meeting data.

The meeting database (34) is configured to cooperate with the agenda identifier (28) and the speech to text converter (32) to receive and store the identified agenda and the minutes of meeting data, respectively. In an embodiment, the meeting database (34) is further configured to store pre-reads related to the meeting. In an embodiment, the top management or CEO or any other employee can review the minutes of meeting (M.O.M) data and pre-reads related to the meeting by accessing the meeting database (34).

The action item identifier (36) is configured cooperate with the meeting database (34) to receive the minutes of meeting data and is further configured to identify a plurality of action items from the minutes of meeting data, based on the action item identification rules.

A pseudo code for action item identifier (36), in accordance with an embodiment of the present disclosure, is now described.

```
GET all the Action items from discussion (MOM)
SET the action items into storage
ASSIGN it to relevant person, impacted category, target date to complete
Get all action items from Storage
EXIT
```

Figure 3:
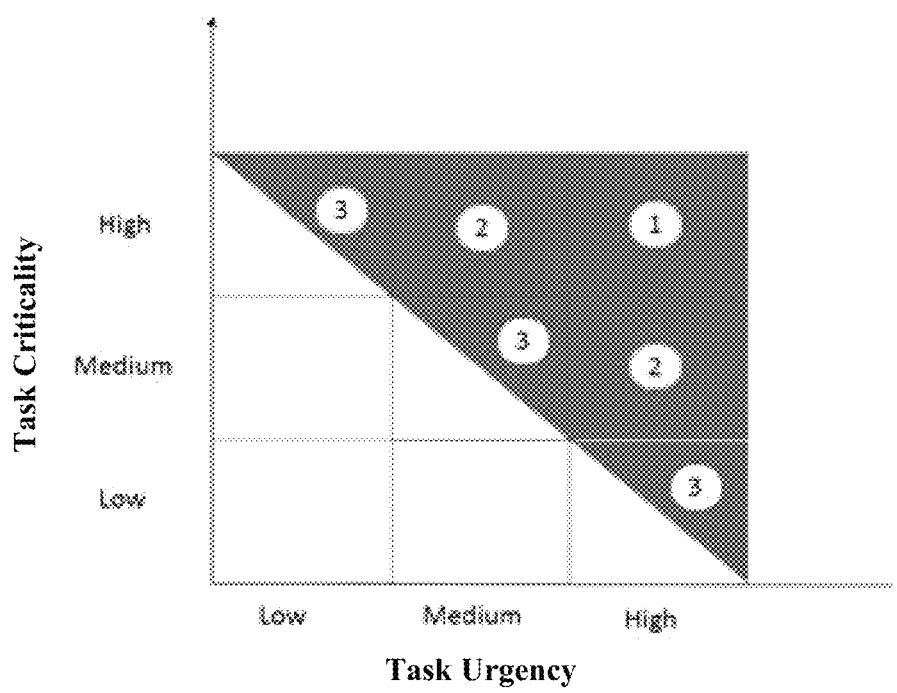
FIG. 3 illustrates a priority graph of action items, in accordance with an embodiment of the present disclosure.

The action item priority assignor (38) is configured to assign priority to each of the identified action items, based on the action item prioritization rules. In an embodiment, the prioritization of the action item is based on a task impact and a closure of action item bring. FIG. 3 illustrates a priority graph of action items, wherein the action item priority assignor (38) provides a higher priority to the action items present in a shaded area.

A pseudo code for action item priority assignor (38), in accordance with an embodiment of the present disclosure, is now described.

```
SET Scoring values for each category (Weightage Out of 100 - In PERCENTAGE)
SET weightage for each ratings ("LOW","MEDIUM","HIGH")
Weightage (Out of 5)
IF Login module returns TRUE THEN
    GET all action items from storage
    FOR EACH action item
        Assign "LOW","MEDIUM","HIGH" ratings to item for each
category (FINANCE,CUSTOMERS,PROCESS,EMPLOYEE)
        //Priority Value in PERCENTAGE
        Calculate priority = (FINANCE Category Score * weightage) +
            (CUSTOMERS Category Score * weightage) +
            (PROCESS Category Score * weightage) +
            (EMPLOYEE Category Score * weightage)
        ASSIGN the calculated priority to action item
    END FOR
    RE-ORDER the action items on the basis of calculated priority in
DECENDING Order
END IF
```

The task impact is based on two factors: task criticality and task urgency.

Task impact=Task criticality*Task urgency

In an embodiment, the task criticality is dependent on following parameters: $ impact of the action item, criticality impact category (topline, bottom-line, strategic, risk/compliance, positioning, and thought leadership) and probability of closure. In one embodiment, the task criticality is defined as the product of the impact category factor and impact potential factor.

Task criticality=Criticality impact factor*Impact potential factor

Table 1 illustrates the criticality impact factor with respect to different criticality impact categories of the action item.

TABLE 1

| Criticality impact category | Criticality impact factor (on a scale of 5) |
|---|---|
| Topline | 5 |
| Bottom-line | 4 |
| Strategic | 5 |
| Risk/compliance | 3 |
| Positioning | 4 |
| Thought leadership | 3 |

In an embodiment, the impact potential can be calculated as:

Impact potential (in terms of $)=$ impact*Probability of closure

Table 2 illustrates a lookup table for identifying an impact potential factor based on the value of impact potential:

TABLE 2

| Impact potential | Impact potential factor |
|---|---|
| $0 to 5 million | 3 |
| $5 to 20 million | 4 |
| $20 million+ | 5 |

In an embodiment, the lookup table is stored in the repository (10).

For example, an action item related to a deal that is in pipeline, having $ impact of 10 million and probability of closure is 50%, the impact potential for this action item can be calculated as:

Impact Potential=$ 10 Million*50% probability=$ 5 Million

The impact potential factor for this particular action item can be identified using the lookup table as illustrated in Table 2.

The task urgency is dependent on following parameters: days left in closure of action item and impact category.

Task urgency=Urgency impact factor*Time factor

Every action item with respect to the task urgency is defined under 6 categories as shown below in Table 3, with their respective urgency impact factor.

TABLE 3

| Urgency Category | Urgency Impact Factor (on a scale of 5) |
|---|---|
| Topline | 5 |
| Bottomline | 5 |
| Strategic | 4 |
| Risk/Compliance | 5 |
| Positioning | 2 |
| Thought Leadership | 2 |

Time factor is calculated on the basis of number of days left in closure of action items, as illustrated in Table 4 below:

TABLE 4

| Days left to close the action item | Time Factor |
|---|---|
| Deadline already crossed | 5 |
| 0 to 15 | 5 |
| 15 to 30 | 4 |
| 30+ | 3 |

The action item assignor (40) is configured to assign each of the action items to at least one of the employees from the plurality of the employees, based on the action item assignment rules.

A pseudo code for action item assignor (40), in accordance with an embodiment of the present disclosure, is now described.

```
IF Login module returns TRUE THEN
    Capture Action Item details from user
    SAVE the Action Item using in storage
    IF Action Item is "Valid"
        MAP Action Item to impacted business category
        Assign Action Item to relevant business category owner
        SET Action Item status = "On Track"
    ELSE IF Action Item is "In Valid"
        SET Action Item status = "Dropped"
    END IF
END IF
```

The action item tracker (42) is configured to track each of the action items to determine a progress status of the action item, and is further configured to send a reminder to the employee with respect to the assigned action item. The action item tracker (42) reduces the need of an associate to follow up with others. The action item tracker (42) keep reminding the employee about the possibility of missing out on action item at regular intervals.

A pseudo code for action item tracker (42), in accordance with an embodiment of the present disclosure, is now described.

```
IF Login module returns TRUE THEN
    GET all action items from Storage (SharePoint) using API
    FOR EACH Action Item
        IF ActionItem completion date will expire in 1 Day OR TODAY
        THEN
            IF Status is Pending THEN
                SEND Reminder Notification to owner
            END IF
        ELSE IF Action Item completion Date Passed THEN
            IF Status is Pending THEN
                SET status = "Needs Attention"
                SEND OverDue Notification to owner
            END IF
        END IF
    EXIT FOR
    // Categorization of all action items
    FOR EACH Action Item
        Catagorize Action Item into 4 Buckets
        Category - I (ALL)
            ORDER all actions items in ASCENDING ORDER of TARGET
DATE and STATUS is Pending
        Category - II (ByStatus)
            ORDER action items by STATUS
            Count action items on the basis of status
        Category - III (ByFunction)
            ORDER action items by FUNCTION
            Count action items on the basis of function
        Category - IV (ByMember)
            ORDER action items by Member (Action By)
            Count action items assigned to Member/Owner
    EXIT FOR
END IF
```

The dashboard (50) is configured to cooperate with the agenda identifier (28), the meeting database (34), the action item identifier (36), the action item assignor (40) and the action item tracker (42), and is further configured to display identified agendas, minutes of the meeting data, identified action items, assignment of each of the action item, and the progress status of action items. The registration module (20), the login module (22), the agenda receiver (26), the agenda identifier (28), the speech to text converter (32), the action item identifier (36), the action item priority assignor (38), the action item assignor (40), the action item tracker (42), and the dashboard (50) are configured to be implemented using one or more processor(s). The dashboard (50) provides a bird eye view of how an employee is doing with regard to their own action item. In an embodiment, the dashboard (50) facilitates drill down operation for getting details of lowest possible unit of the action item.

In an embodiment, the computer implemented system (100) for monitoring meetings and action items further includes a directory (52) and a search module (54). The directory (52) is configured to store email ids and phone numbers of the employees. The search module (54) is configured to facilitate search of any email id, phone number, action items, meeting agendas in the directory (52) and the meeting database (34). The directory (52) and the search module (54) are implemented using one or more processor(s). The directory (52) also facilitates a feature of one touch dial, where an employee can call or mail any other employee in a single step. The search module (54) is configured to facilitate search of any email id, phone number, action items, meeting agendas and the like.

A pseudo code for search module (54), in accordance with an embodiment of the present disclosure, is now described.

```
IF Login Module returns True then //Check if user Authorized to access
the app or functionality
    Capture Search Text from User
    Form Search Query
    Execute Query
    Fetch Result
    Process Result Data
    Display on App
ELSE
    Display "UnAuthorised Access"
END IF
```

In an embodiment, the system (100) includes a classification module (56). The classification module (56) is configured to classify the action items based on the priority of the action item, the progress status of the action item, and the employee to which the action item is assigned. The classification module (56) is implemented using one or more processor(s).

In an embodiment, the system (100) includes a broadcast module (58). The broadcast module (58) is configured to cooperate with the meeting database (34), the action item assignor (40) to broadcast the identified agenda, minutes of meeting data, the pre-reads related to the meeting, and the assigned action item to an employee's mobile device. The broadcast module (58) is implemented using one or more processor(s).

A pseudo code for broadcast module (58), in accordance with an embodiment of the present disclosure, is now described.

```
Let messageDetail
SET messageDetail = message received to broadcast module
Get all registered device details from Storage (Device ID, Device Type)
FOR EACH Registered Device
    IF DeviceType is "ios" THEN
        broadcast messageDetail using APNS service
    ELSE IF DeviceType is "android" THEN
        broadcast message Detail using firebase cloud messaging service
    END IF
NEXT
```

In an embodiment, the system (100) includes a notepad module (60). The notepad module (60) is configured to facilitate each of the employees to take personal notes.

A pseudo code for notepad module (60), in accordance with an embodiment of the present disclosure, is now described.

```
IF Login Module returns True then //Check if user Authorized to access
the app or functionality
    LET noteText = ""
    IF Text Mode THEN
        noteText = User Entered Text
    ELSE Voice Mode THEN
        noteText = text returned by VoiceToText Module
    END IF
    Store noteText in database
END IF
```

Figure 2A:
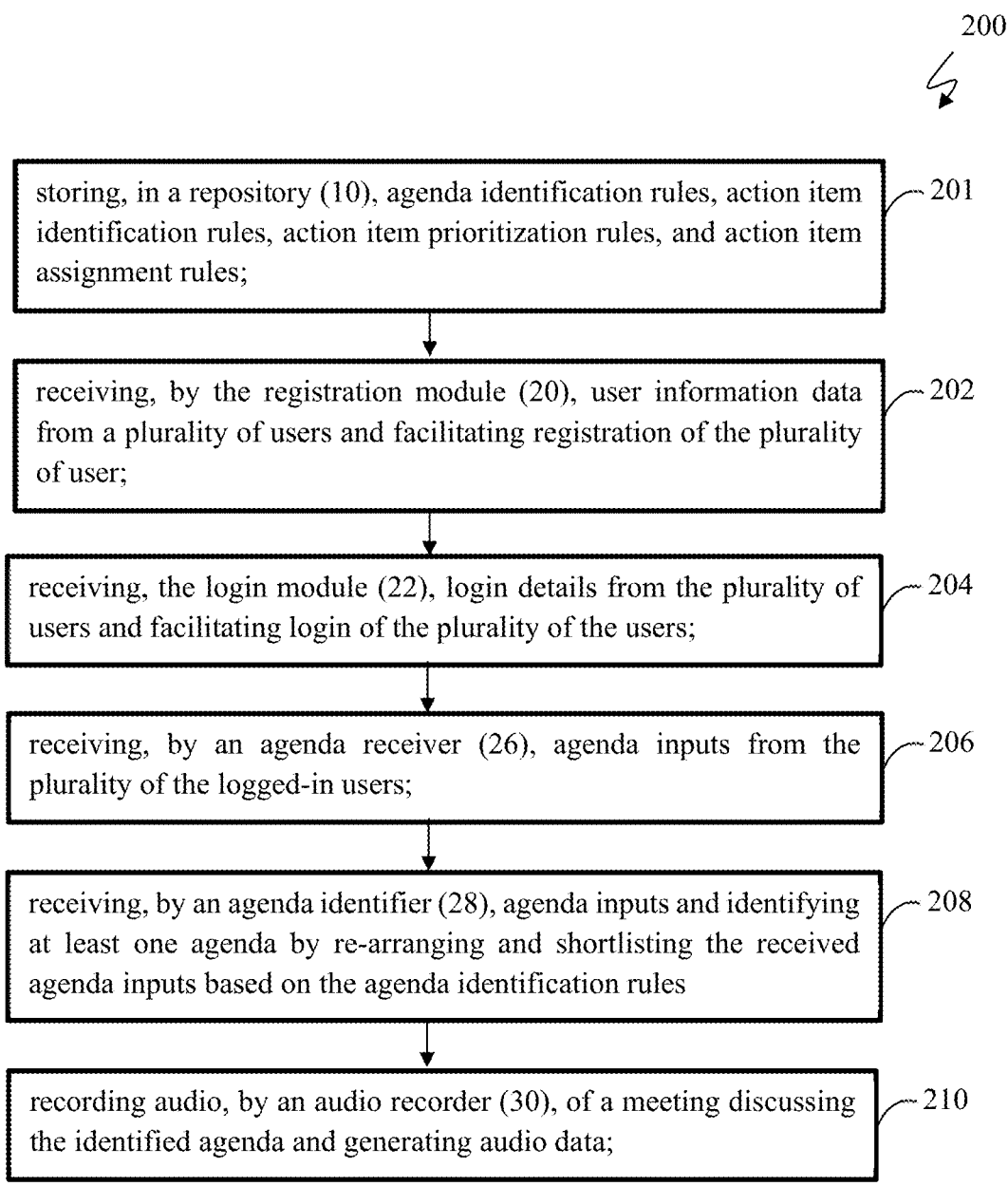
FIGS. 2A and 2B illustrate a flow diagram showing steps performed by the computer implemented system for monitoring meetings and action items of FIG. 1, in accordance with an embodiment of the present disclosure.
Figure 2B:
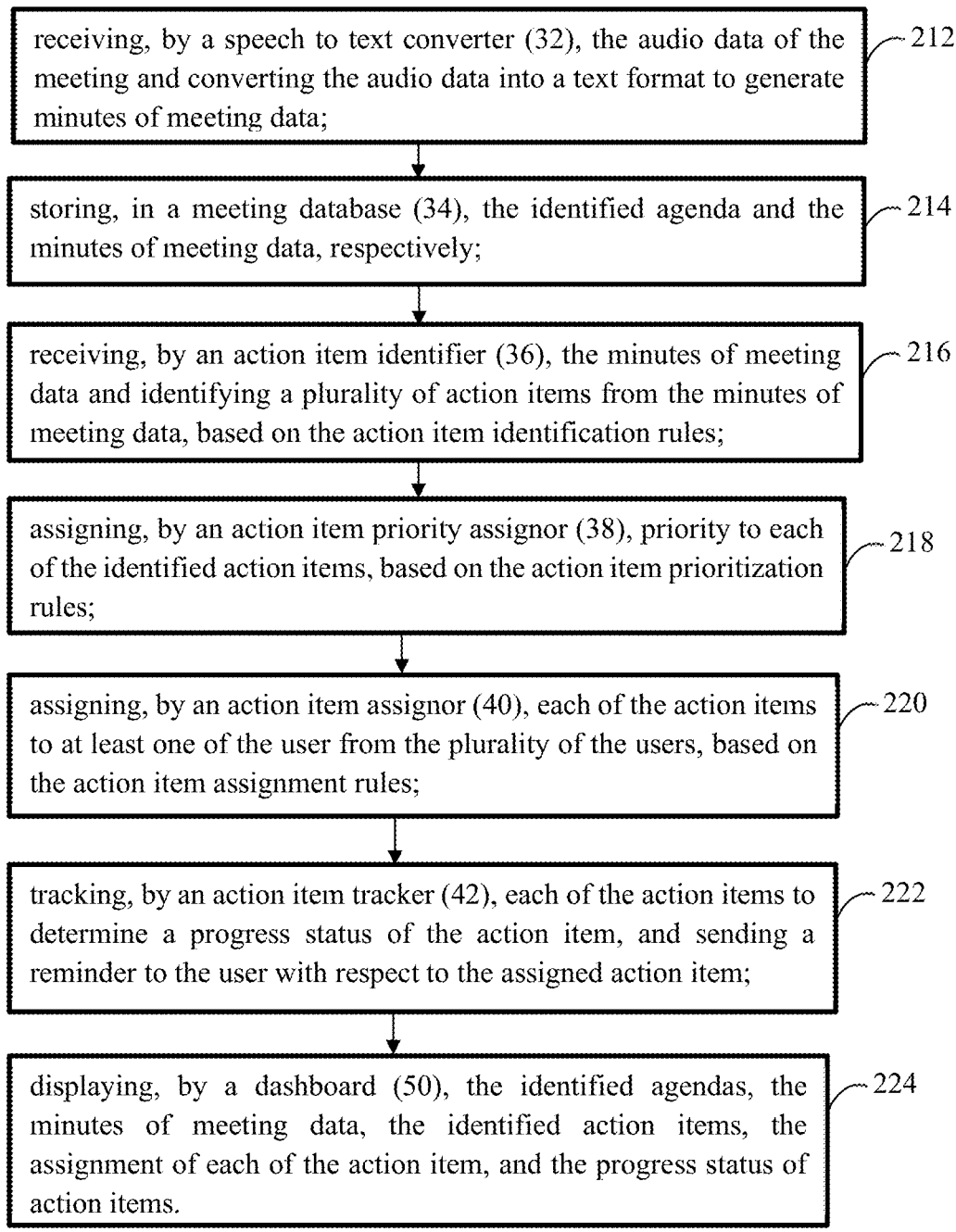

FIGS. 2A and 2B illustrate a flow diagram (200) showing method steps performed by the system (100), in accordance with an embodiment of the present disclosure.

At block 201, storing agenda identification rules, action item identification rules, action item prioritization rules, and action item assignment rules. In an embodiment, a repository (10) stores the agenda identification rules, action item identification rules, action item prioritization rules, and action item assignment rules.

At block 202, receiving employee information data from a plurality of employees and facilitating registration of the plurality of employees. In an embodiment, the registration module (20), receives employee information data from a plurality of employees and facilitates registration of the plurality of employees.

At block 204, receiving login details from the plurality of employees and facilitating login of the plurality of the employees. In an embodiment, the login module (22) receives login details from the plurality of employees and facilitates login of the plurality of the employees.

At block 206, receiving agenda inputs from the plurality of the logged-in employees. In an embodiment, an agenda receiver (26) receives agenda inputs from the plurality of the logged-in employees.

At block 208, receiving agenda inputs and identifying at least one agenda by re-arranging and shortlisting the received agenda inputs based on the agenda identification rules. In an embodiment, an agenda identifier (28) receives agenda inputs and identifies at least one agenda by re-arranging and shortlisting the received agenda inputs based on the agenda identification rules.

At block 210, recording audio of a meeting with respect to the identified agenda and generating audio data. In an embodiment, an audio recorder (30), records audio of the meeting with respect to the identified agenda and generates audio data.

At block 212, receiving the audio data of the meeting and converting the audio data into a text format to generate minutes of meeting data. In an embodiment, a speech to text converter (32) receives the audio data of the meeting and converts the audio data into a text format to generate minutes of meeting data.

At block 214, storing the identified agenda and the minutes of meeting data, respectively. In an embodiment, a speech to text converter (32) stores the identified agenda and the minutes of meeting data, respectively.

At block 216, receiving the minutes of meeting data and identifying a plurality of action items from the minutes of meeting data, based on the action item identification rules. In an embodiment, by an action item identifier (36) receives the minutes of meeting data and identifies a plurality of action items from the minutes of meeting data, based on the action item identification rules.

At block 218, assigning priority to each of the identified action items, based on the action item prioritization rules. In an embodiment, an action item priority assignor (38) assigns priority to each of the identified action items, based on the action item prioritization rules.

At block 220, assigning each of the action items to at least one of the employees from the plurality of the employees, based on the action item assignment rules. In an embodiment, an action item assignor (40) assigns each of the action items to at least one of the employees from the plurality of the employees, based on the action item assignment rules.

At block 222, tracking each of the action items to determine a progress status of the action item, and sending a reminder to the employee with respect to the assigned action item. In an embodiment, an action item tracker (42) tracks each of the action items to determine a progress status of the action item, and sends a reminder to the employee with respect to the assigned action item At block 224, displaying the identified agendas, the minutes of meeting data, the identified action items, the assignment of each of the action items, and the progress status of action items. In an embodiment, a dashboard (50) displays the identified agendas, the minutes of meeting data, the identified action items, the assignment of each of the action items, and the progress status of action items.

The system as disclosed in the present disclosure prioritizes records on the basis of pre-defined parameters. This makes the process of ranking the records in order of their importance much more feasible. The system as disclosed in the present disclosure helps the management to focus on the records (action items) thereby saving management's bandwidth.

The pre-defined parameters are as follows:
1. Topline
2. Bottom-line
3. Strategic
4. Risk/compliance
5. Positioning
6. Thought Leadership The timeline to close the actions also acts as a parameter in automated prioritization of the records. It gives the user notifications when an action item has a closure date, thereby alerting the user and improving the overall efficiency of the system.

The conventional system uses e-mails as a way of following up on action items between managers and the team. As per a study, 40% of a manager's time is spent on following up with the team on any particular action item. The system as disclosed in the present disclosure automatically monitors the action items and marks a copy to the manager, thereby saving the time of the manager.

Technical Advancements

The present disclosure described herein above has several technical advantages including, but not limited to, the realization of a computer implemented system for monitoring meetings and action items, which:
  reduces the need of follow-up; and
  allows employees to access previous minutes of meetings.

The embodiments hereinabove and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A computer implemented system (100) for monitoring meetings and action items comprising:
 a repository (10) configured to store agenda identification rules, action item identification rules, action item prioritization rules, and action item assignment rules;
 a registration module (20) configured to receive employee information data from a plurality of employees and further configured to facilitate registration of the plurality of employees;
 a login module (22) configured to receive login details from the plurality of employees and further configured to facilitate login of the plurality of the employees;
 an agenda receiver (26) configured to receive agenda inputs from the plurality of the logged-in employees;
 an agenda identifier (28) configured to cooperate with the agenda receiver (26) to receive agenda inputs and further configured to identify at least one agenda by re-arranging and shortlisting the received agenda inputs based on agenda identification rules;
 an audio recorder (30) configured to record audio of a currently held meeting with respect to the identified agenda and generates audio data;
 a speech to text converter (32) configured to cooperate with the audio recorder (30) to receive the audio data of the currently held meeting and further configured to convert the audio data into a text format to generate minutes of meeting data;
 a meeting database (34) configured to cooperate with the agenda identifier (28) and the speech to text converter (32) to receive and store the identified agenda and the minutes of meeting data, respectively;
 an action item identifier (36) configured cooperate with the meeting database (34) to receive the minutes of meeting data and further configured to identify a plurality of action items from the minutes of meeting data, based on the action item identification rules;
 an action item priority assignor (38) configured to assign priority to each of the identified action items in the currently held meeting, based on the action item prioritization rules including a task impact and a closure of action item;
 an action item assignor (40) configured to assign each of the action items to at least one of the employees from the plurality of the employees, based on the action item assignment rules;
 an action item tracker (42) configured to track each of the action items to determine a progress status of the action item, and further configured to send a reminder to the employee with respect to the assigned action item;
 a dashboard (50) configured to cooperate with the agenda identifier (28), the meeting database (34), the action item identifier (36), the action item assignor (40) and the action item tracker (42), and further configured to display identified agendas, minutes of the meeting data, identified action items, assignment of each of the action items, the progress status of action items,
 wherein the registration module (20), the login module (22), the agenda receiver (26), the agenda identifier (28), the speech to text converter (32), the action item identifier (36), the action item priority assignor (38), the action item assignor (40), the action item tracker (42), and the dashboard (50) are configured to implemented using one or more processor(s).

2. The computer implemented system (100) for monitoring meetings and action items as claimed in claim 1, further includes:
 a directory (52) configured to store email ids and phone numbers of the employees; and
 a search module (54) configured to facilitate search of any email id, phone number, action items, meeting agendas in the directory (52) and meeting database (34),
 wherein the directory (52) and the search module (54) are implemented using one or more processor(s).

3. The computer implemented system (100) for monitoring meetings and action items as claimed in claim 1, wherein the meeting database (34) is further configured to store pre-reads related to the currently held meeting.

4. The computer implemented system (100) for monitoring meetings and action items as claimed in claim 1, wherein the login module (22) includes a verifier module (24) configured to verify the employee by comparing the receive login details with a pre-stored login details of the employee.

5. The computer implemented system (100) for monitoring meetings and action items as claimed in claim 1, which includes a classification module (56) configured to classify the action items based on the priority of the action item, the progress status of the action item, and the employee to which the action item is assigned, wherein the classification module (56) is implemented using one or more processor(s).

6. The computer implemented system (100) for monitoring meetings and action items as claimed in claim 1, which includes a broadcast module (58) configured to cooperate with the meeting database (34), and the action item assignor (40) to broadcast the identified agenda, minutes of meeting data, the pre-reads related to the currently held meeting, and the assigned action item to an employee's mobile device, wherein the broadcast module (58) is implemented using one or more processor(s).

7. The computer implemented system (100) for monitoring meetings and action items as claimed in claim 1, which includes a notepad module (60) configured to facilitate each of the employees to take personal notes.

8. The computer implemented system (100) for monitoring meetings and action items as claimed in claim 1, wherein the audio recorder (30) includes a voice recognition unit (31) configured to identify voice of each the employees.

9. The computer implemented system (100) for monitoring meetings and action items as claimed in claim 1, the task impact is determined based on a set of factors including a task criticality and a task urgency.

10. The computer implemented system (100) for monitoring meetings and action items as claimed in claim 9, wherein the task criticality is determined based on a criticality impact factor and an impact potential factor, and wherein the task criticality is dependent on a set of prioritizing parameters including impact of the action item and criticality impact category, and wherein the criticality impact category is determined based on topline, bottomline, strategic, risk/compliance, positioning, thought leadership, and probability of closure.

11. The computer implemented system (100) for monitoring meetings and action items as claimed in claim 10, wherein the impact potential factor is determined based on a predefined value of an impact factor and a probability score pertaining to the closure of the action item.

12. The computer implemented system (100) for monitoring meetings and action items as claimed in claim 9, wherein the task urgency is determined based on a count of days left in the closure of the action item and the criticality impact category.

13. A computer implemented method (200) for monitoring meetings and action items comprises the steps of:

storing, in a repository (10), agenda identification rules, action item identification rules, action item prioritization rules, and action item assignment rules;

receiving, by the registration module (20), employee information data from a plurality of employees and facilitating registration of the plurality of employees;

receiving, the login module (22), login details from the plurality of employees and facilitating login of the plurality of the employees;

receiving, by an agenda receiver (26), agenda inputs from the plurality of the logged-in employees;

receiving, by an agenda identifier (28), agenda inputs and identifying at least one agenda by re-arranging and shortlisting the received agenda inputs based on the agenda identification rules;

recording audio, by an audio recorder (30), of a currently held meeting with respect to the identified agenda and generating audio data;

receiving, by a speech to text converter (32), the audio data of the currently held meeting and converting the audio data into a text format to generate minutes of meeting data;

storing, in a meeting database (34), the identified agenda and the minutes of meeting data, respectively;

receiving, by an action item identifier (36), the minutes of meeting data and identifying a plurality of action items from the minutes of meeting data, based on the action item identification rules;

assigning, by an action item priority assignor (38), priority to each of the identified action items in the currently held meeting, based on the action item prioritization rules including a task impact and a closure of action item;

assigning, by an action item assignor (40), each of the action items to at least one of the employees from the plurality of the employees, based on the action item assignment rules;

tracking, by an action item tracker (42), each of the action items to determine a progress status of the action item, and sending a reminder to the employee with respect to the assigned action item; and displaying, by a dashboard (50), the identified agendas, the minutes of meeting data, the identified action items, the assignment of each of the action item, and the progress status of action items.

14. The method (200) for monitoring meetings and action items as claimed in claim 13, wherein the task impact is determined based on a set of factors including a task criticality and a task urgency.

15. The method (200) for monitoring meetings and action items as claimed in claim 14, wherein the task criticality is determined based on a criticality impact factor and an impact potential factor, and wherein the task criticality is dependent on a set of prioritizing parameters including impact of the action item and criticality impact category, and wherein the criticality impact category is determined based on topline, bottomline, strategic, risk/compliance, positioning, thought leadership, and probability of closure.

16. The method (200) for monitoring meetings and action items as claimed in claim 15, wherein the impact potential factor is determined based on a predefined value of an impact factor and a probability score pertaining to the closure of the action item.

17. The method (200) for monitoring meetings and action items as claimed in claim 14, wherein the task urgency is determined based on a count of days left in the closure of the action item and the criticality impact category.

* * * * *